(12) United States Patent
Kawano

(10) Patent No.: US 12,141,305 B2
(45) Date of Patent: Nov. 12, 2024

(54) INFORMATION PROCESSING APPARATUS AND NON-TRANSITORY COMPUTER READABLE MEDIUM

(71) Applicant: FUJIFILM BUSINESS INNOVATION CORP., Tokyo (JP)

(72) Inventor: Yusuke Kawano, Kanagawa (JP)

(73) Assignee: FUJIFILM BUSINESS INNOVATION CORP., Tokyo (JP)

( * ) Notice: Subject to any disclaimer, the term of this patent is extended or adjusted under 35 U.S.C. 154(b) by 534 days.

(21) Appl. No.: 17/023,826

(22) Filed: Sep. 17, 2020

(65) Prior Publication Data

US 2021/0286887 A1    Sep. 16, 2021

(30) Foreign Application Priority Data

Mar. 11, 2020  (JP) ................................. 2020-042386

(51) Int. Cl.
*G06F 21/62* (2013.01)
*G06F 3/0482* (2013.01)
*G06F 21/60* (2013.01)

(52) U.S. Cl.
CPC ........ *G06F 21/6218* (2013.01); *G06F 3/0482* (2013.01); *G06F 21/604* (2013.01); *G06F 2221/2141* (2013.01)

(58) Field of Classification Search
CPC .. G06F 21/6218; G06F 3/0482; G06F 21/604; G06F 2221/2141; G06F 2221/2117
See application file for complete search history.

(56) References Cited

U.S. PATENT DOCUMENTS

| 6,169,976 B1 * | 1/2001 | Colosso ................. G06F 21/10 705/56 |
| 8,813,252 B2 * | 8/2014 | Lal ......................... G06F 21/10 726/28 |

(Continued)

FOREIGN PATENT DOCUMENTS

| JP | 2001-216222 A | 8/2001 |
| JP | 2009-075932 A | 4/2009 |

(Continued)

OTHER PUBLICATIONS

Dec. 12, 2023 Office Action issued in Japanese Patent Application No. 2020-042386.

*Primary Examiner* — Sharon S Lynch
(74) *Attorney, Agent, or Firm* — Oliff PLC

(57) ABSTRACT

An information processing apparatus includes a processor configured to receive, from a user, entry of an access right granting request to grant another user a right to access data included in managed data; where the other user is an unregistered user who hasn't been registered yet in a database, receive entry of information on the other user, receive entry of approval of the other user by an administrator who manages the managed data, register the other user in the database on a basis of the approval, and permit the other user to access the data, and in a case where the other user has been already registered in the database on a basis of past approval by the administrator, permit the other user to access the data without entry of the approval by the administrator received after the receipt of the entry of the access right granting request.

14 Claims, 11 Drawing Sheets

(56) References Cited

U.S. PATENT DOCUMENTS

| | | | |
|---|---|---|---|
| 9,203,819 B2 * | 12/2015 | Fenton | H04L 9/14 |
| 9,218,406 B2 * | 12/2015 | Barrall | G06F 16/27 |
| 9,449,182 B1 * | 9/2016 | Dang | H04L 63/101 |
| 10,257,196 B2 * | 4/2019 | Dang | G06Q 10/101 |
| 10,567,382 B2 * | 2/2020 | Dang | G06F 16/178 |
| 11,818,272 B2 * | 11/2023 | Kirsch | H04L 9/3263 |
| 2003/0236977 A1 * | 12/2003 | Levas | G06F 21/6218 713/158 |
| 2005/0102154 A1 * | 5/2005 | Dodd | G06Q 30/0279 705/329 |
| 2007/0150299 A1 * | 6/2007 | Flory | H04L 63/20 705/344 |
| 2011/0082888 A1 * | 4/2011 | Martin | G06Q 10/10 707/E17.03 |
| 2012/0079607 A1 * | 3/2012 | Lal | G06F 21/10 726/29 |
| 2013/0061335 A1 * | 3/2013 | Schwabe | G06F 21/6218 726/28 |
| 2013/0198516 A1 * | 8/2013 | Fenton | H04L 9/3263 713/168 |
| 2013/0290256 A1 * | 10/2013 | Barrall | G06F 16/183 707/634 |
| 2016/0315941 A1 * | 10/2016 | Dang | G06F 21/62 |
| 2016/0352725 A1 * | 12/2016 | Kupper | H04L 9/3271 |
| 2017/0012984 A1 * | 1/2017 | Dang | H04L 63/10 |
| 2018/0012029 A1 | 1/2018 | Ito et al. | |
| 2018/0077147 A1 * | 3/2018 | Kelsey | H04L 9/3231 |
| 2023/0025808 A1 * | 1/2023 | Gupta | H04L 63/20 |

FOREIGN PATENT DOCUMENTS

| | | |
|---|---|---|
| JP | 2010-039786 A | 2/2010 |
| JP | 2015-001926 A | 1/2015 |
| JP | 2016-053822 A | 4/2016 |
| JP | 2018-010377 A | 1/2018 |

* cited by examiner

FIG. 4A

| IDENTIFIER OF DISCLOSURE | DISCLOSURE TIME LIMIT | TARGET DOCUMENT ID | DOCUMENT NAME | DISCLOSURE URL ID |
|---|---|---|---|---|
| aaa | FEBRUARY 6, 2020 | Doc-12345, ... | AA SHIPPING SLIP, ... | Ir1JZ57icTTg5Gby45Np |
| bbb | MARCH 12, 2020 | doc-23456, ... | BB DESIGN DRAFT, ... | i27gWsaa9waoVmxh1X8h |

| IDENTIFIER OF DISCLOSURE | DISCLOSEE E-MAIL ADDRESS | DISCLOSEE ID | FAMILY NAME | FIRST NAME | REGISTERED/ UNREGISTERED |
|---|---|---|---|---|---|
| aaa | taro.yama@sample.com | 111111 | | | true |
| aaa | hanako.fuji@sample.com | | FUJI | HANAKO | false |
| bbb | xxx@sample.com | 222222 | | | true |
| bbb | yyy@sample.com | | YYY | | false |

| USER ID | LOGIN NAME (E-MAIL ADDRESS) | PASSWORD |
|---|---|---|
| 111111 | taro.yama@sample.com | Tfytguojo;8hgi7s |
| 222222 | xxx@sample.com | gawetynftudnrt |
| 333333 | hanako.fuji@sample.com | abcde (TEMPORARY PASSWORD) |

15D

⇦ ADD

FIG. 6

DISCLOSURE OF DOCUMENT

NAME

MESSAGE

TIME AND DATA OF END OF DISCLOSURE
(EXAMPLE) 21:30:0

DISCLOSEE
[ADD] [DELETE]  [ADD UNREGISTERED USER]

| | USER | E-MAIL ADDRESS | USER ID | | OFFICE USER |
|---|---|---|---|---|---|
| ☐ | A-O FUJI | aaayyyy@fujixerox.co.jp | 123456 | ✓ | |
| ☐ | B-KO FUJI | bbbxxxx@fujixerox.co.jp | | | |

DISCLOSED DOCUMENT

| No. | NAME | CONTENT SIZE | COMMENT | |
|---|---|---|---|---|
| 1 | REQUEST FOR ESTIMATION A | 28.1 KB | THIS IS A REQUEST FOR ESTIMATION A. | ... |
| 2 | REQUEST FOR ESTIMATION B | 28.1 KB | | ... |

[CANCEL] [DISCLOSE]

ADD UNREGISTERED USER
FAMILY NAME *REQUIRED
FIRST NAME
E-MAIL ADDRESS *REQUIRED
[CANCEL] [REGISTER]

FIG. 7

| NAME | E-MAIL ADDRESS | PERSON WHO MADE REQUEST | REQUEST COMMENT |
|---|---|---|---|
| ☐ B-KO FUJI | bbbxxx@fujixerox.co.jp | D-SUKE FUJI | THIS IS A REQUEST FROM DOCUMENT DISCLOSURE (SEND DESIGN DRAFT) |
| ☐ C-MI FUJI | ccczzzz@fujixerox.co.jp | D-SUKE FUJI | THIS IS A REQUEST FROM DOCUMENT DISCLOSURE (SEND DESIGN DRAFT) |

GUEST USER REGISTRATION

USERS WHOSE REGISTRATION HAS BEEN REQUESTED ARE DISPLAYED BELOW.

[REGISTER] [REJECT]

FIG. 8

GUEST USER REGISTRATION

REGISTER | REJECT

USERS WHOSE REGISTRATION HAS BEEN REQUESTED ARE DISPLAYED BELOW.

| NAME | E-MAIL ADDRESS | PERSON WHO MADE REQUEST | REQUEST COMMENT |
|---|---|---|---|
| ☐ B-KO FUJI | bbbxxx@fujixerox.co.jp | D-SUKE FUJI | THIS IS A REQUEST FROM DOCUMENT DISCLOSURE (SEND DESIGN DRAFT). |
| ☐ T-DA S-O | tststs@xxxcom.net | D-SUKE FUJI | THIS IS A REQUEST FROM DOCUMENT DISCLOSURE (SEND DESIGN DRAFT). |

FIG. 12

DOCUMENT DISCLOSURE INFORMATION

INFORMATION ON DISCLOSED DOCUMENT IS DISPLAYED.
DOWNLOAD DOCUMENT BY TIME AND DATE OF END OF DISCLOSURE. YOU CANNOT ACCESS THIS PAGE AFTER TIME AND DATE OF DISCLOSURE.

DISCLOSEE: B-KO FUJI
NAME: REQUEST FOR ESTIMATION
MESSAGE: PLEASE MAKE ESTIMATE.

TIME AND DATE OF DISCLOSURE: OCTOBER 31, 2019    18:00:00.000

DISCLOSED DOCUMENT

| No. | NAME | CONTENT TYPE | CONTENT SIZE | REVISION NUMBER | TIME AND DATA OF UPDATE OF CONTENT | COMMENT |
|---|---|---|---|---|---|---|
| 1 | REQUEST FOR ESTIMATION A | application/pdf | 28.1 KB | 1 | OCTOBER 12, 2019  7:56:11 | THIS IS REQUEST FOR ESTIMATION A |
| 2 | REQUEST FOR ESTIMATION B | application/pdf | 28.1 KB | 1 | OCTOBER 12, 2019  7:56:11 | |

■ DOWNLOAD

INFORMATION PROCESSING APPARATUS AND NON-TRANSITORY COMPUTER READABLE MEDIUM

CROSS-REFERENCE TO RELATED APPLICATIONS

This application is based on and claims priority under 35 USC 119 from Japanese Patent Application No. 2020-042386 filed Mar. 11, 2020.

BACKGROUND

(i) Technical Field

The present disclosure relates to an information processing apparatus and a non-transitory computer readable medium.

(ii) Related Art

For example, Japanese Unexamined Patent Application Publication No. 2018-10377 describes an information processing system that grants a registered user a right to access data. This information processing system includes a receiving unit that receives an unregistered user as a user who will be granted a right to access specific data and a granting unit that grants this user received by the receiving unit a right to access the specific data in a case where this user is registered.

SUMMARY

When a user attempts to grant an other user a right to access data (hereinafter referred to as "disclose data"), the user may ask for approval from an administrator as to whether or not the other user is appropriate as a user (hereinafter referred to as a "disclosee") to whom the data is to be disclosed from the perspective of security. However, if the administrator needs to approve a disclosee every time data is disclosed, this is troublesome for the administrator.

Aspects of non-limiting embodiments of the present disclosure relate to providing an information processing apparatus and a non-transitory computer readable medium that can lessen the trouble of an administrator in a case where a user attempts to disclose data to an other user as compared with a case where the administrator needs to approve a disclosee every time data is disclosed.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided an information processing apparatus including a processor configured to receive, from a user, entry of an access right granting request to grant an other user a right to access data included in managed data; in a case where the other user is an unregistered user who has not been registered yet in a database, receive entry of information on the other user, receive entry of approval of the other user by an administrator who manages the managed data, register the other user in the database on a basis of the approval, and permit the other user to access the data, and in a case where the other user has been already registered in the database on a basis of past approval by the administrator, permit the other user to access the data without entry of the approval by the administrator received after the receipt of the entry of the access right granting request.

BRIEF DESCRIPTION OF THE DRAWINGS

Exemplary embodiments of the present disclosure will be described in detail based on the following figures, wherein:

FIG. 4A illustrates an example of a disclosure information management DB according to the exemplary embodiment, FIG. 4B illustrates an example of a disclosee information management DB according to the exemplary embodiment, and FIG. 4C illustrates an example of a user management DB according to the exemplary embodiment.

FIG. 6 is a front view illustrating an example of a disclosee setting screen according to the exemplary embodiment;

FIG. 7 is a front view illustrating an example of a guest user registration screen according to the exemplary embodiment;

FIG. 8 is a front view illustrating an example of a guest user registration screen having a changed display form according to the exemplary embodiment;

FIG. 12 is a front view illustrating an example of a download screen according to the exemplary embodiment.

DETAILED DESCRIPTION

Exemplary embodiments of the present disclosure are described in detail below with reference to the drawings.

First Exemplary Embodiment

Figure 1:
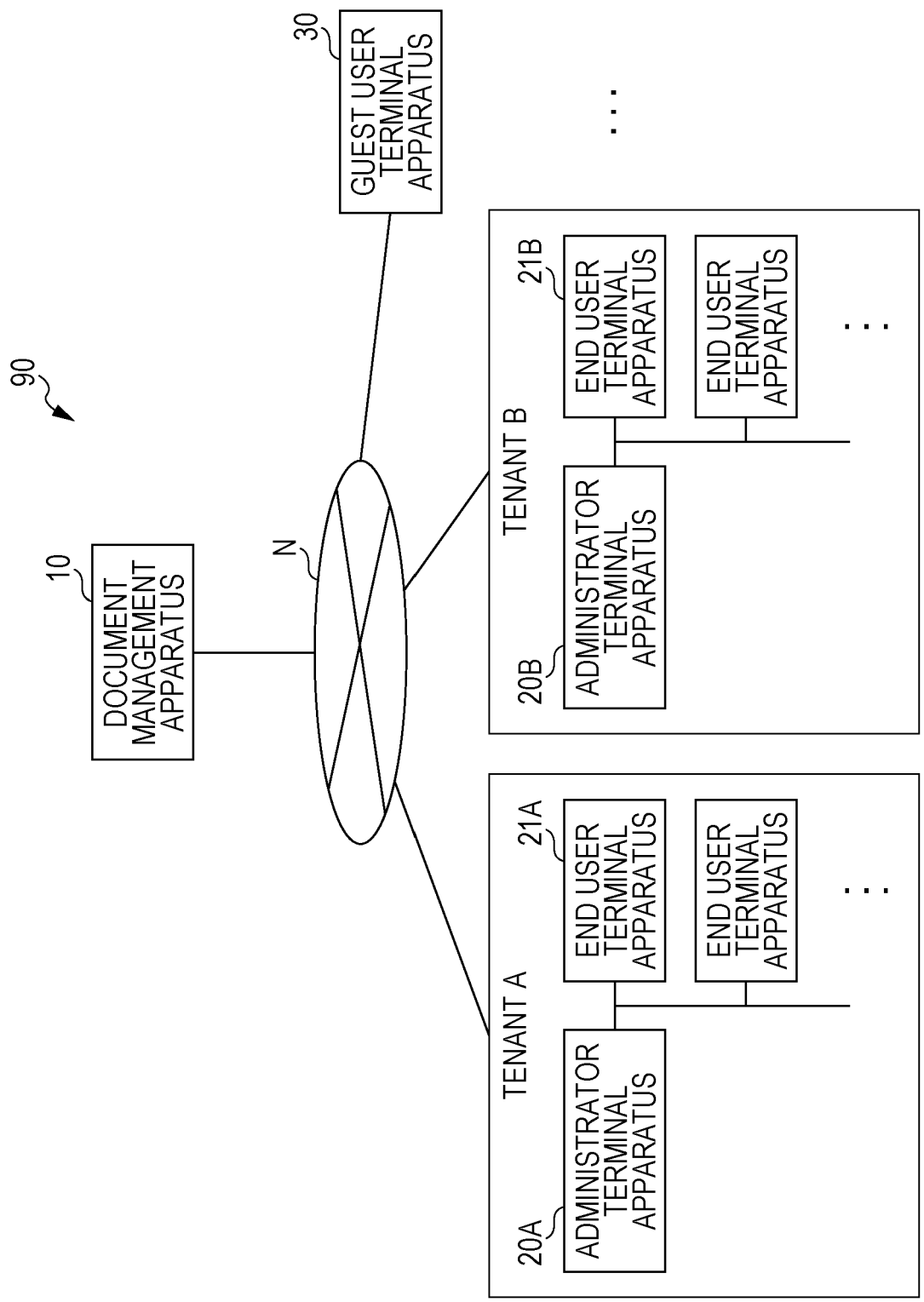
FIG. 1 illustrates an example of a document management system according to a first exemplary embodiment.

FIG. 1 illustrates an example of a document management system 90 according to a first exemplary embodiment.

As illustrated in FIG. 1, the document management system 90 according to the present exemplary embodiment includes a document management apparatus 10, administrator terminal apparatuses 20A and 20B, and end user terminal apparatuses 21A and 21B. The document management apparatus 10 is an example of an information processing apparatus.

The document management apparatus 10 according to the present exemplary embodiment is, for example, a general-purpose computer such as a server computer or a personal computer (PC). The document management apparatus 10 functions as a cloud server that can offer a document management service. This document management service is a service for managing storage, view, disclosure, and the like of an electronic document. This document may be an image or the like and is an example of data. The document management apparatus 10 is connected to the administrator terminal apparatuses 20A and 20B and the end user terminal apparatuses 21A and 21B over a network N. The network N is, for example, a network such as the Internet, a local area network (LAN), or a wide area network (WAN).

Although plural tenants (tenants A and B in the example of FIG. 1) are provided in the present exemplary embodiment, only a single tenant may be provided. The "tenant" as used herein refers to a customer (e.g., a company, a local government) that is offered the document management service by the document management system 90. In this document management service, a document is managed for each tenant. In each tenant, there are an administrator (hereinafter referred to as a "tenant administrator") who administers the tenant and a user (hereinafter referred to as an "end user") registered in the tenant. The tenant administrator and the end user are registered in the document management system 90. The tenant administrator and the end user each have a client access license (CAL) and can use the document management service related to his or her tenant. An authority given to the end user is more restricted than an authority given to the tenant administrator. Furthermore, there is an administrator (hereinafter referred to as a "system administrator") who administers the whole document management system 90. The system administrator has an authority to collectively administer the tenants.

In the tenant A, the administrator terminal apparatus 20A and the plural end user terminal apparatuses 21A are provided. The administrator terminal apparatus 20A is a terminal apparatus used by the tenant administrator of the tenant A and is, for example, a PC, a smartphone, or a tablet terminal. Each of the end user terminal apparatuses 21A is a terminal apparatus used by an end user registered in the tenant A and is, for example, a PC, a smartphone, or a tablet terminal. The administrator terminal apparatus 20A and the plural end user terminal apparatuses 21A are connected over a LAN constructed in the tenant A.

Similarly, the administrator terminal apparatus 20B and the plural end user terminal apparatuses 21B are provided in the tenant B. The administrator terminal apparatus 20B is a terminal apparatus used by the tenant administrator of the tenant B and is, for example, a PC, a smartphone, or a tablet terminal. The end user terminal apparatus 21B is a terminal apparatus used by an end user registered in the tenant B and is, for example, a PC, a smartphone, or a tablet terminal. The administrator terminal apparatus 20B and the plural end user terminal apparatuses 21B are connected over a LAN constructed in the tenant B.

A guest user terminal apparatus 30 is connected to the network N. The guest user terminal apparatus 30 is a terminal apparatus used by a user (hereinafter referred to as a "guest user") who is not registered in the document management system 90 and is, for example, a PC, a smartphone, or a tablet terminal. The guest user cannot refer to any document managed in the document management system 90 unless the guest user is registered for each tenant.

Figure 2:
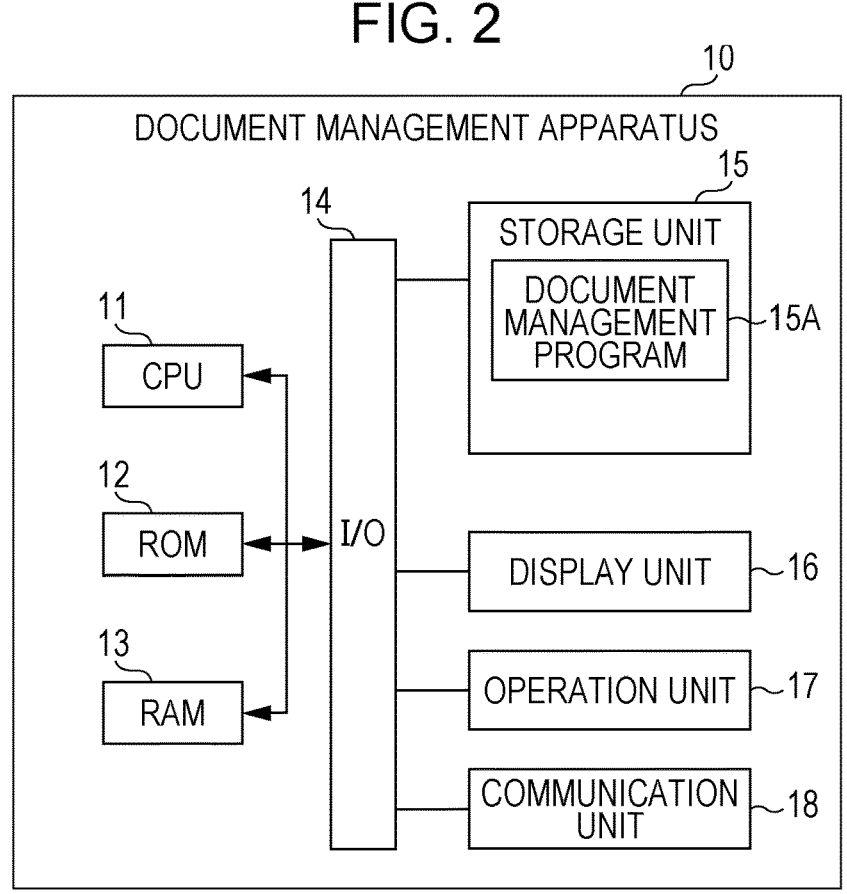
FIG. 2 is a block diagram illustrating an example of an electric configuration of a document management apparatus according to the first exemplary embodiment.

FIG. 2 is a block diagram illustrating an example of an electric configuration of the document management apparatus 10 according to the first exemplary embodiment.

As illustrated in FIG. 2, the document management apparatus 10 according to the present exemplary embodiment includes a central processing unit (CPU) 11, a read only memory (ROM) 12, a random access memory (RAM) 13, an input output interface (I/O) 14, a storage unit 15, a display unit 16, an operation unit 17, and a communication unit 18.

The CPU 11, the ROM 12, the RAM 13, and the I/O 14 are connected to one another through a bus. The I/O 14 is connected to functional units including the storage unit 15, the display unit 16, the operation unit 17, and the communication unit 18. These functional units can communicate with the CPU 11 through the I/O 14.

The CPU 11, the ROM 12, the RAM 13, and the I/O 14 constitute a controller. The controller may be a sub controller that controls operation of part of the document management apparatus 10 or may be a part of a central controller that controls operation of the whole document management apparatus 10. Part or all of each block of the controller is, for example, an integrated circuit such as large scale integration (LSI) or an integrated circuit (IC) chipset. The blocks may be individual circuits or part or all of the blocks may be integrated within a circuit. The blocks may be integral with one another or one or more of the blocks may be separately provided. Part of each of the blocks may be separately provided. Integration of the controller is not limited to LSI and may be realized by a dedicated circuit or a general-purpose processor.

The storage unit 15 is, for example, a hard disk drive (HDD), a solid state drive (SSD), or a flash memory. A document management program 15A according to the present exemplary embodiment is stored in the storage unit 15. This document management program 15A may be stored in the ROM 12. This document management program 15A is an example of an information processing program.

The document management program 15A may be, for example, preinstalled in the document management apparatus 10. The document management program 15A stored in a non-volatile storage medium or distributed over the network N may be installed as appropriate into the document management apparatus 10. Examples of the non-volatile storage medium include a compact disc read only memory (CD-ROM), an magnetooptical disc, an HDD, a digital versatile disc read only memory (DVD-ROM), a flash memory, and a memory card.

The display unit 16 is, for example, a liquid crystal display (LCD) or an organic electro luminescence (EL) display. The display unit 16 may have a touch panel that is integral with the display unit 16. The operation unit 17 has devices for operation input such as a keyboard and a mouse. The display unit 16 and the operation unit 17 receive various instructions from a user of the document management apparatus 10. The display unit 16 displays various kinds of information such as a result of processing executed in accordance with an instruction received from a user and a notification concerning processing.

The communication unit 18 is connected to the network N such as the Internet, LAN, or WAN and can communicate with external apparatuses such as the administrator terminal apparatuses 20A and 20B and the end user terminal apparatuses 21A and 21B over the network N.

When an end user attempts to disclose a document to a guest user, the end user may ask for approval from the tenant administrator or the system administrator as to whether or not the guest user is appropriate as a disclosee. However, if the tenant administrator or the system administrator needs to approve a disclosee every time a document is disclosed, this is troublesome for the tenant administrator or the system administrator.

Figure 3:
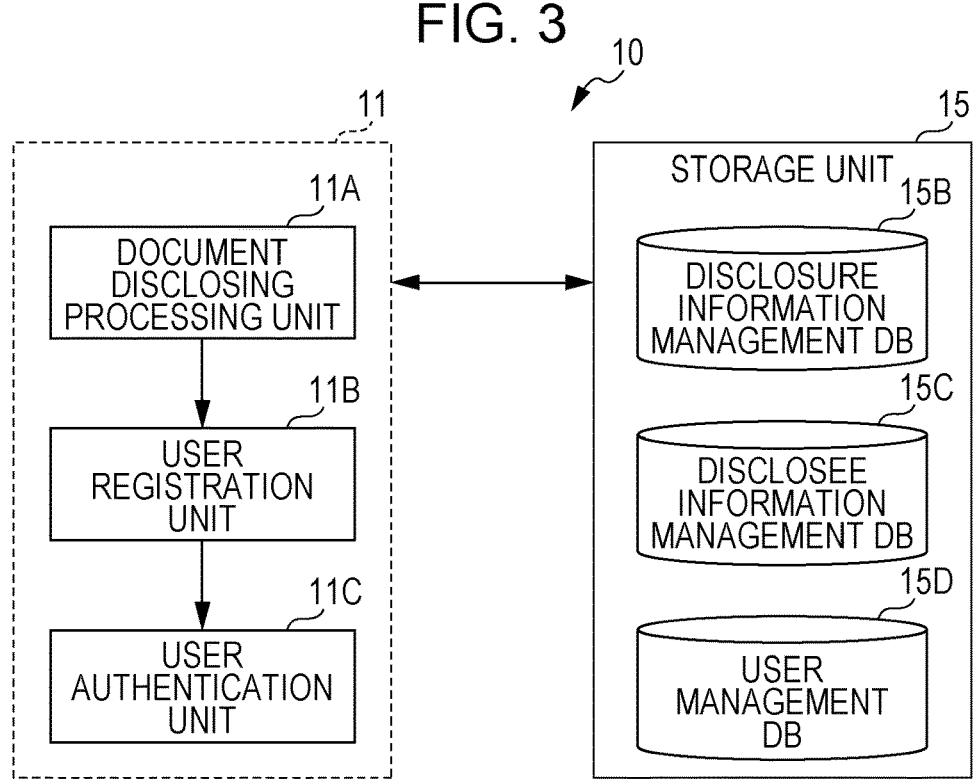
FIG. 3 is a block diagram illustrating an example of a functional configuration of the document management apparatus according to the first exemplary embodiment.

The CPU 11 of the document management apparatus 10 according to the present exemplary embodiment functions as the units illustrated in FIG. 3 by writing the document management program 15A stored in the storage unit 15 into the RAM 13 and executing the document management program 15A. Note that the CPU 11 is an example of a processor.

FIG. 3 is a block diagram illustrating an example of a functional configuration of the document management apparatus 10 according to the first exemplary embodiment.

As illustrated in FIG. 3, the CPU 11 of the document management apparatus 10 according to the present exemplary embodiment functions as a document disclosing processing unit 11A, a user registration unit 11B, and a user authentication unit 11C.

In the storage unit 15 according to the present exemplary embodiment, a disclosure information management database (hereinafter referred to as a "disclosure information management DB") 15B, a disclosee information management database (hereinafter referred to as a "disclosee information management DB") 15C, and a user management database (hereinafter referred to as a "user management DB") 15D are stored. In the present exemplary embodiment, the disclosure information management DB 15B, the disclosee information management DB 15C, and the user management DB 15D are stored per tenant.

The disclosure information management DB 15B stores, for example, disclosure information on a document to be disclosed, as illustrated in FIG. 4A.

FIG. 4A illustrates an example of the disclosure information management DB 15B according to the present exemplary embodiment.

The disclosure information management DB 15B illustrated in FIG. 4A stores therein, for example, a disclosure time limit, a target document ID (Identification), a document name, and a disclosure URL (Uniform Resource Locator) ID in association with an identifier of disclosure. The disclosure information management DB 15B does not store therein information on a disclosee.

The disclosee information management DB 15C stores therein, for example, disclosee information on a disclosee, as illustrated in FIG. 4B.

FIG. 4B illustrates an example of the disclosee information management DB 15C according to the present exemplary embodiment.

The disclosee information management DB 15C illustrated in FIG. 4B stores therein, for example, an e-mail address of a disclosee (corresponding to a "disclosee e-mail address" in FIG. 4B), a user ID (corresponding to a "disclosee ID" in FIG. 4B), a family name, a first name, and registered/unregistered as disclosee information on a disclosee in association with an identifier of disclosure managed in the disclosure information management DB 15B. Note that registered/unregistered indicates whether or not a user has been registered. Specifically, "true" indicates that the user has been registered, and "false" indicates that the user has not been registered. The disclosee information management DB 15C also stores therein information necessary for registering an unregistered user in the document management system 90. A blank space in the user ID column indicates that a user has not been registered yet.

The user management DB 15D stores, for example, information on a user to be registered, as illustrated in FIG. 4C.

FIG. 4C illustrates an example of the user management DB 15D according to the present exemplary embodiment.

The user management DB 15D illustrated in FIG. 4C stores therein, for example, an e-mail address and a password in association with a user ID.

The document disclosing processing unit 11A according to the present exemplary embodiment performs processing for disclosing a document to a guest user upon receipt of an instruction from a user (e.g., an end user) who has a right to access the document. That is, the document disclosing processing unit 11A receives, from an end user, entry of an access right granting request to grant a guest user a right to access a document among managed documents. In a case where the guest user is an unregistered user who has not been registered yet in the disclosee information management DB 15C, the document disclosing processing unit 11A receives entry of information on the guest user. It is desirable that the end user enter the information on the guest user. The document disclosing processing unit 11A receives entry of approval of the guest user from the tenant administrator. The tenant administrator is an administrator who manages plural documents. This approval may be given by a system administrator instead of the tenant administrator.

Furthermore, for example, the document disclosing processing unit 11A may cause a disclosee setting screen 40 illustrated in FIG. 6 (described later) to be displayed on the end user terminal apparatus 21A. The disclosee setting screen 40 is a screen for entry of an access right granting request to grant a guest user a right to access a document and is an example of a setting screen. In this case, the document disclosing processing unit 11A receives entry of information on the guest user who is an unregistered user from the end user on the disclosee setting screen 40.

The user registration unit 11B according to the present exemplary embodiment acquires a list of unregistered users from the disclosee information management DB 15C and registers a user under approval of the tenant administrator. That is, the user registration unit 11B registers a guest user who is an unregistered user in the user management DB 15D and the disclosee information management DB 15C on the basis of tenant administrator's approval received by the document disclosing processing unit 11A. When a guest user (the third user from the top in the example of FIG. 4C) is added to the user management DB 15D, the guest user is given a user ID ("333333" in this example), which is an identifier unique to a registered user, and is thus registered. In response to this, a value ("333333" in this example) is also registered in a corresponding part (a user ID of "Hanako Fuji" in the example of FIG. 4B) of the disclosee information management DB 15C.

Furthermore, for example, the user registration unit 11B may cause a guest user registration screen 50 illustrated in FIG. 7 (described later) to be displayed on the administrator terminal apparatus 20A. The guest user registration screen 50 is a screen including a list of guest users who are unregistered users and is an example of a registration screen.

The user authentication unit 11C according to the present exemplary embodiment permits a guest user registered by the user registration unit 11B to access a document. Specifically, the user authentication unit 11C discloses the document to the guest user by using information registered in the user management DB 15D.

Meanwhile, the user authentication unit 11C permits a guest user to access a document without entry by the tenant administrator after receipt of entry of the access right granting request in a case where the guest user is a user registered in the past in the user management DB 15D and the disclosee information management DB 15C on the basis of tenant administrator's approval.

On the disclosee setting screen 40, a registered user, who has been already registered, is selectable as a disclosee to whom a document is to be disclosed. That is, both a registered user and a guest user who is an unregistered user are selectable as a disclosee on the disclosee setting screen 40. In the present exemplary embodiment, in a case where a guest user who is an unregistered user and a registered user are set as disclosees to whom a document is to be disclosed on the disclosee setting screen 40, the user authentication unit 11C permits, after registration of the guest user as a newly-registered user by the tenant administrator, the newly-registered user and the registered user to access the document. In the present exemplary embodiment, the document is disclosed to the newly-registered user and the registered user at the same time.

Next, operation of the document management apparatus 10 according to the first exemplary embodiment is described with reference to FIG. 5.

Figure 5:
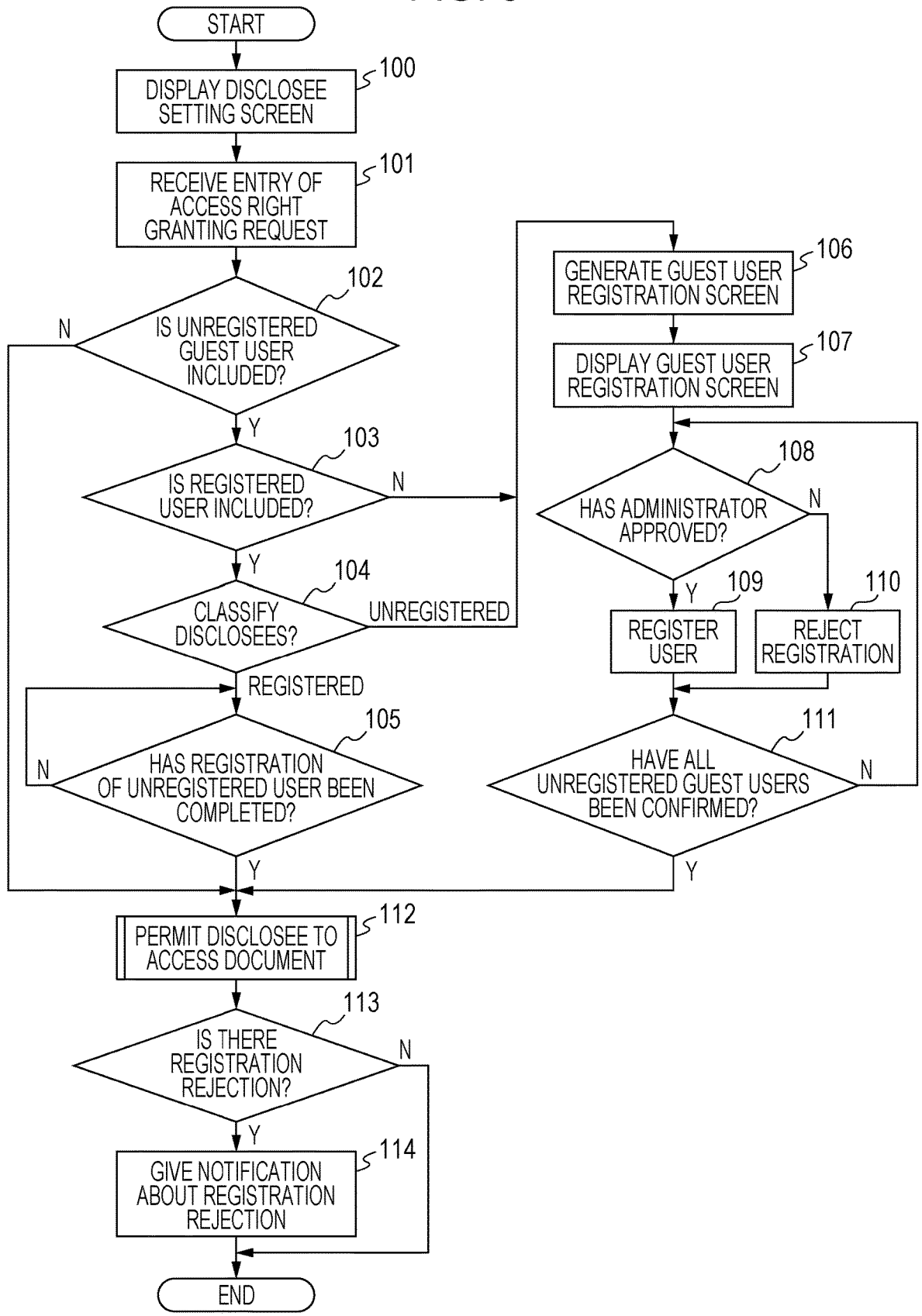
FIG. 5 is a flowchart illustrating an example of flow of processing performed by a document management program according to the first exemplary embodiment.

FIG. 5 is a flowchart illustrating an example of a flow of processing performed by the document management program 15A according to the first exemplary embodiment. Although a case where a document managed in the tenant A is disclosed to a guest user is described in the present exemplary embodiment, the same applies to a case where a document managed in a different tenant is disclosed to a guest user.

First, when the document management apparatus 10 receives an instruction to set a disclosee from the end user terminal apparatus 21A, the CPU 11 activates the document management program 15A and executes the following steps.

In step 100 of FIG. 5, for example, the CPU 11 causes the disclosee setting screen 40 illustrated in FIG. 6 to be displayed on the end user terminal apparatus 21A.

FIG. 6 is a front view illustrating an example of the disclosee setting screen 40 according to the present exemplary embodiment.

The disclosee setting screen 40 illustrated in FIG. 6 is a screen for entry of an access right granting request to give a guest user a right to access a document among managed documents, as described above. An end user designates a document to be disclosed, time and date of end of disclosure (disclosure time limit), a disclosee, and the like on the disclosee setting screen 40. In a case where the end user wants to designate a registered user as a disclosee, the end user conducts a search for the registered user from a user search dialogue (not illustrated) and designates the registered user. In a case where the end user wants to designate a guest user who is an unregistered user as a disclosee, the end user presses an "ADD UNREGISTERED USER" button 40A. When the "ADD UNREGISTERED USER" button 40A is pressed, a dialogue 40B is displayed. The dialogue 40B is a dialogue for adding an unregistered user. In this example, the guest user is added as an unregistered user. Information on the guest user entered in the dialogue 40B includes, for example, information (e.g., an e-mail address) which the guest user uses for login when accessing the document and information (e.g., a family name and a first name of the guest user) for grasping who the guest user is. When a registration button 40C of the dialogue 40B is pressed by the end user, the added guest user is displayed in a disclosee list 40D of the disclosee setting screen 40. A user who is not given a user ID in the disclosee list 40D is an unregistered user. When the end user presses a "DISCLOSE" button 40E of the disclosee setting screen 40, an access right granting request including the disclosee information is transmitted to the document management apparatus 10.

In step 101, the CPU 11 receives entry of the access right granting request received from the end user terminal apparatus 21A. Disclosure information of the document included in the access right granting request is registered in the disclosure information management DB 15B, and disclosee information on a disclosee(s) to whom the document is to be disclosed is registered in the disclosee information management DB 15C.

In step 102, the CPU 11 determines whether or not the disclosee(s) include an unregistered guest user by referring to the disclosee information management DB 15C. In a case where the CPU 11 determines that the disclosee(s) include an unregistered guest user (Yes in step 102), step 103 is performed. Meanwhile, in a case where the CPU 11 determines that the disclosee(s) include no unregistered guest user, that is, all of the disclosee(s) are registered users (No in step 102), step 112 is performed.

In step 103, the CPU 11 determines whether or not the disclosee(s) include a registered user by referring to the disclosee information management DB 15C. In a case where the CPU 11 determines that the disclosee(s) include a registered user, that is, include both an unregistered guest user and a registered user (Yes in step 103), step 104 is performed. Meanwhile, in a case where the disclosee(s) include no registered user, that is, all of the disclosee(s) are unregistered guest users (No in step 103), step 106 is performed. The "registered user" as used herein encompasses an end user of the tenant A and a user who was an unregistered guest user in the past but is currently a registered user.

In step 104, the CPU 11 classifies the disclosees included in the disclosee list into registered or unregistered. In a case where the CPU 11 classifies a disclosee into registered (in a case where the disclosee has been already registered), step 105 is performed. Meanwhile, in a case where the CPU 11 classifies a disclosee into unregistered (in a case where the disclosee has not been registered yet), step 106 is performed.

In step 105, the CPU 11 determines whether or not registration of the unregistered user has been completed. In a case where the CPU 11 determines that registration of the unregistered user has been completed (Yes in step 105), step 112 is performed. Meanwhile, in a case where the CPU 11 determines that registration of the unregistered user has not been completed (No in step 105), the CPU 11 waits in step 105.

Meanwhile, in step 106, the CPU 11 acquires information on a guest user who is an unregistered user and generates, for example, the guest user registration screen 50 illustrated in FIG. 7. Note that the information on the guest user who is an unregistered user is acquired from the disclosee information management DB 15C.

In step 107, the CPU 11 causes the guest user registration screen 50 generated in step 106 to be displayed on the administrator terminal apparatus 20A.

FIG. 7 is a front view illustrating an example of the guest user registration screen 50 according to the present exemplary embodiment.

The guest user registration screen 50 illustrated in FIG. 7 is a screen including an unregistered user list 50A, as described above. The tenant administrator checks the unregistered user list 50A displayed on the guest user registration screen 50 and determines whether or not to register each unregistered user. When a "REGISTER" button 50B is pressed, user registration is approved. The approval may be given collectively for plural unregistered users or may be individually given for each of the unregistered users. When a "REJECT" button 50C is pressed, user registration is rejected. In a case where the unregistered user list 50A includes an unregistered user for whom rejection of registration is recommended, a display form of the screen may be, for example, changed as illustrated in FIG. 8.

FIG. 8 is a front view illustrating an example of the guest user registration screen 50 having a changed display form according to the present exemplary embodiment.

On the guest user registration screen 50 illustrated in FIG. 8, a display form has been changed so that an unregistered user for whom rejection of registration is recommended and an unregistered user for whom rejection of registration is not recommended are distinguishable from each other in the unregistered user list 50A. In the example of FIG. 8, a character string 50D indicative of the unregistered user for whom rejection of registration is recommended is highlighted. Note that the change of the display form is not limited to highlighting and can be any of various methods such as underlining the character string 50D, making the character string 50D bold, making the character string 50D italic, changing a font size, and changing a color of the font. Whether or not an unregistered user is a user for whom rejection of registration is recommended is, for example, determined on the basis of a domain name of an e-mail address of the unregistered user. Specifically, for example, in a case where the domain name does not include "co.jp", it is highly likely that the user is an individual user, and therefore rejection of registration is recommended from the perspective of security.

Furthermore, whether or not an unregistered user is given a client access license (CAL) may be selectable when the unregistered user is registered although illustration is omitted on the guest user registration screen 50. The CAL can give a user an authority equivalent to an authority of an end user. Note, however, that even a user without a CAL can log in and access a designated disclosed document in a case where the user is registered as described above.

In step 108, the CPU 11 determines whether or not the tenant administrator has approved registration of an unregistered guest user. In a case where the CPU 11 determines that the tenant administrator has approved registration of the guest user, that is, the tenant administrator has pressed the "REGISTER" button 50B on the guest user registration screen 50 (Yes in step 108), step 109 is performed. Meanwhile, in a case where the CPU 11 determines that the tenant administrator does not approve registration of the guest user, that is, the tenant administrator has pressed the "REJECT" button 50C on the guest user registration screen 50 (No in step 108), step 110 is performed.

In step 109, the CPU 11 registers the unregistered guest user in the user management DB 15D and the disclosee information management DB 15C upon the approval by the tenant administrator in step 108.

In step 110, the CPU 11 grants a user registration rejection flag to the unregistered guest user upon the rejection by the tenant administrator in step 108.

In step 111, the CPU 11 determines whether or not approval or disapproval has been confirmed for all of the unregistered guest users. In a case where it is determined that approval or disapproval has been confirmed for all of the unregistered guest users (Yes in step 111), step 112 is performed. In a case where it is determined that approval or disapproval has not been confirmed for all of the unregistered guest users (No in step 111), the processing returns to step 108, and the above processes are repeated.

In step 112, the CPU 11 permits a disclosee to access the document upon access from the disclosee. Document access permission processing is specifically described below with reference to FIG. 9.

Figure 9:
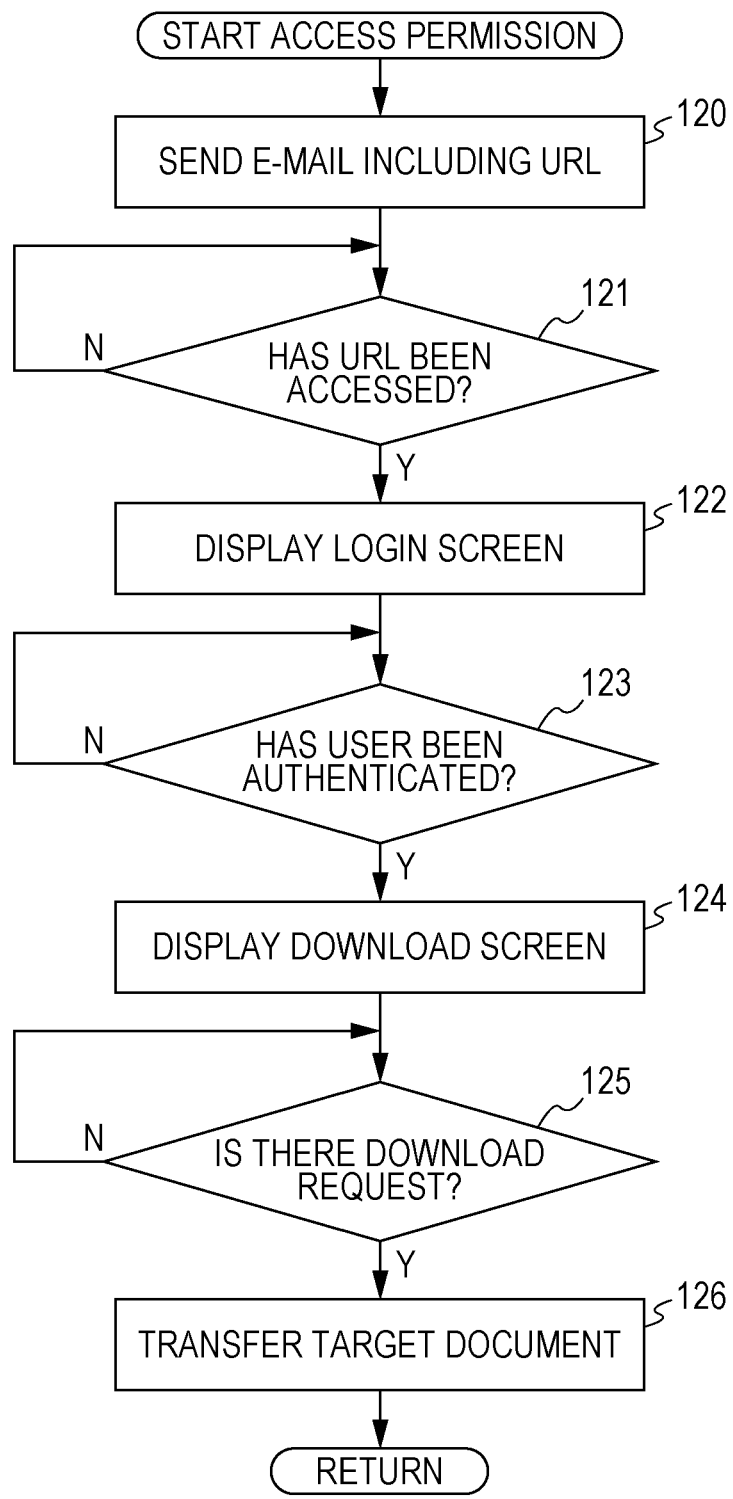
FIG. 9 is a flowchart illustrating an example of flow of document access permission processing according to the first exemplary embodiment.

FIG. 9 is a flowchart illustrating an example of flow of the document access permission processing according to the first exemplary embodiment.

Figure 10:
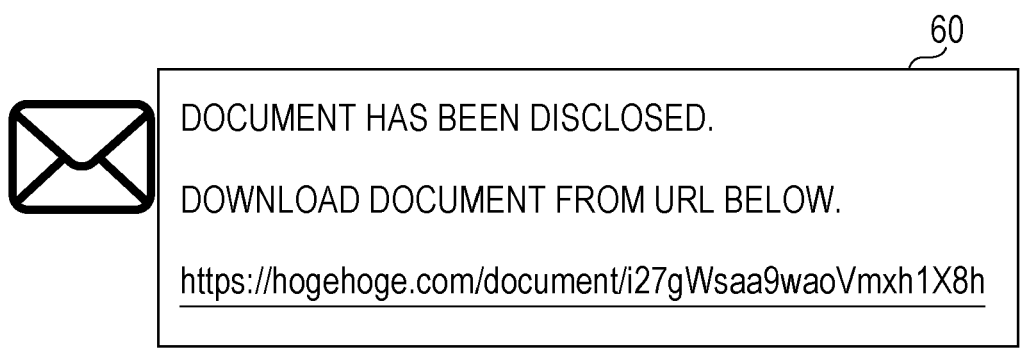
FIG. 10 illustrates an example of an e-mail including a URL for disclosed document acquisition according to the exemplary embodiment.

In step 120 of FIG. 9, the CPU 11 performs control for transmitting, for example, an e-mail 60 including a URL for disclosed document acquisition illustrated in FIG. 10 to a terminal apparatus (e.g., the end user terminal apparatus 21A or the guest user terminal apparatus 30) of a disclosee. FIG. 10 illustrates an example of the e-mail 60 including an URL for disclosed document acquisition according to the present exemplary embodiment.

The e-mail 60 illustrated in FIG. 10 includes a URL for disclosed document acquisition. A user who has received the e-mail 60 can cause a login screen and a download screen, which will be described later, to be displayed by accessing the URL.

In step 121, the CPU 11 determines whether or not the disclosee has accessed the URL of the e-mail 60. In a case where the CPU 11 determines that the disclosee has accessed the URL of the e-mail 60 (Yes in step 121), step 122 is performed. In a case where it is determined that the disclosee has not accessed the URL of the e-mail 60 (No in step 121), the CPU 11 waits in step 121.

Figure 11:
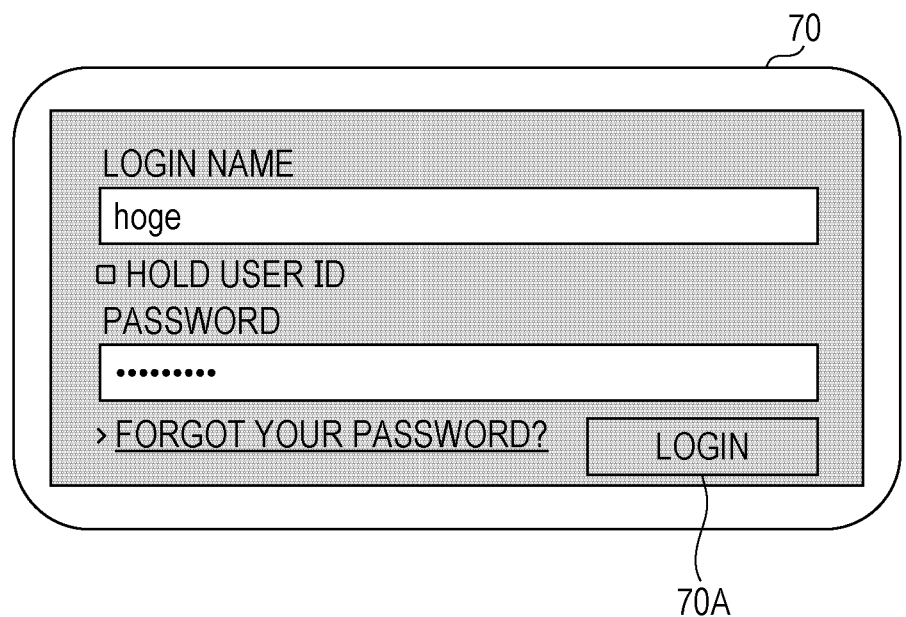
FIG. 11 is a front view illustrating an example of a login screen according to the exemplary embodiment.

In step 122, the CPU 11 performs control for displaying, for example, a login screen 70 illustrated in FIG. 11 on the terminal apparatus (e.g., the end user terminal apparatus 21A or the guest user terminal apparatus 30) of the disclosee.

FIG. 11 is a front view illustrating an example of the login screen 70 according to the present exemplary embodiment.

The login screen 70 illustrated in FIG. 11 has fields for entry of a login name and a password and a "LOGIN" button 70A. In a case of an unregistered guest user, an e-mail address, which is a login name, and a temporary password are additionally registered in the user management DB 15D when the guest user is registered. Since the temporary password is information necessary for initial login, the guest user is notified about the temporary password by an e-mail. The temporary password can be changed according to need. Furthermore, a user ID associated with the e-mail address or a user name set in association with the e-mail address by the user may be used as the login name instead of the e-mail address. When the disclosee enters the e-mail address and the password on the login screen 70 and presses the "LOGIN" button 70A, the e-mail address and the password are transmitted to the document management apparatus 10.

In step 123, the CPU 11 determines whether or not the user has been successfully authenticated by referring to the user management DB 15D on the basis of the login name and the password received from the disclosee. In a case where it is determined that the user has been successfully authenticated (Yes in step 123), step 124 is performed. Meanwhile, in a case where it is determined that the user cannot be authenticated (No in step 123), the CPU 11 waits in step 123.

In step 124, the CPU 11 performs control for displaying, for example, a download screen 80 illustrated in FIG. 12 on the terminal apparatus (e.g., the end user terminal apparatus 21A or the guest user terminal apparatus 30) of the disclosee.

FIG. 12 is a front view illustrating an example of the download screen 80 according to the present exemplary embodiment.

The download screen 80 illustrated in FIG. 12 is a screen for downloading a document to be disclosed and has a "DOWNLOAD" button 80A.

In step 125, the CPU 11 determines whether or not the disclosee has made a download request on the download screen 80. In a case where it is determined that the download request has been made, that is, the "DOWNLOAD" button 80A has been pressed (Yes in step 125), step 126 is performed. Meanwhile, in a case where it is determined that the download request has not been made, that is, the "DOWNLOAD" button 80A has not been pressed (No in step 125), the CPU 11 waits in step 125.

In step 126, the CPU 11 transfers the target document to the terminal apparatus (e.g., the end user terminal apparatus 21A or the guest user terminal apparatus 30) of the disclosee in response to the download request in step 125, and the processing returns to step 113 in FIG. 5.

In step 113 of FIG. 5, the CPU 11 determines whether or not there is registration rejection, that is, there is a guest user given a rejection flag in step 110. In a case where it is determined there is registration rejection (Yes in step 113), step 114 is performed. Meanwhile, in a case where there is no registration rejection (No in step 113), the series of processing performed by the document management program 15A is finished.

In step 114, the CPU 11 notifies the end user terminal apparatus 21A of the end user who has requested registration of the guest user about the registration rejection, for example, by e-mail and finishes the series of processing performed by the document management program 15A. The notification about the registration rejection may be given in step 110. In this case, an e-mail including the notification about the registration rejection is transmitted without giving the rejection flag. In this case, step 113 and step 114 are unnecessary.

As described above, according to the present exemplary embodiment, in a case where an end user attempts to disclose a document to a guest user, a tenant administrator or a system administrator needs to approve the disclosee only at a time of registration of the guest user. Since the tenant administrator or the system administrator need not approve the disclosee every time the document is disclosed, the approving work becomes less troublesome.

Furthermore, a document is disclosed to a newly-registered user and a registered user at the same time. Accordingly, the newly-registered user can acquire the document at the same timing as the registered user.

Second Exemplary Embodiment

In the first exemplary embodiment, a document is disclosed to a newly-registered user and a registered user at the same time. In the present exemplary embodiment, a document is sequentially disclosed to a newly-registered user and a registered user.

A document management apparatus 10 according to the present exemplary embodiment has a similar configuration to the document management apparatus 10 described in the first exemplary embodiment, and repeated description thereof is omitted. The following describes only differences with reference to FIG. 3.

On a disclosee setting screen 40 described above, a registered user, who has been already registered, is further selectable as a disclosee to which a document is to be disclosed. In a case where a guest user who is an unregistered user and a registered user are set as disclosees to which a document is to be disclosed on the disclosee setting screen 40, a user authentication unit 11C according to the present exemplary embodiment requests a tenant administrator to register information on the unregistered guest user and permits the registered user to access the document. That is, in the present exemplary embodiment, the document is sequentially disclosed to the newly-registered user and the registered user.

Next, operation of the document management apparatus 10 according to the second exemplary embodiment is described with reference to FIG. 13.

Figure 13:
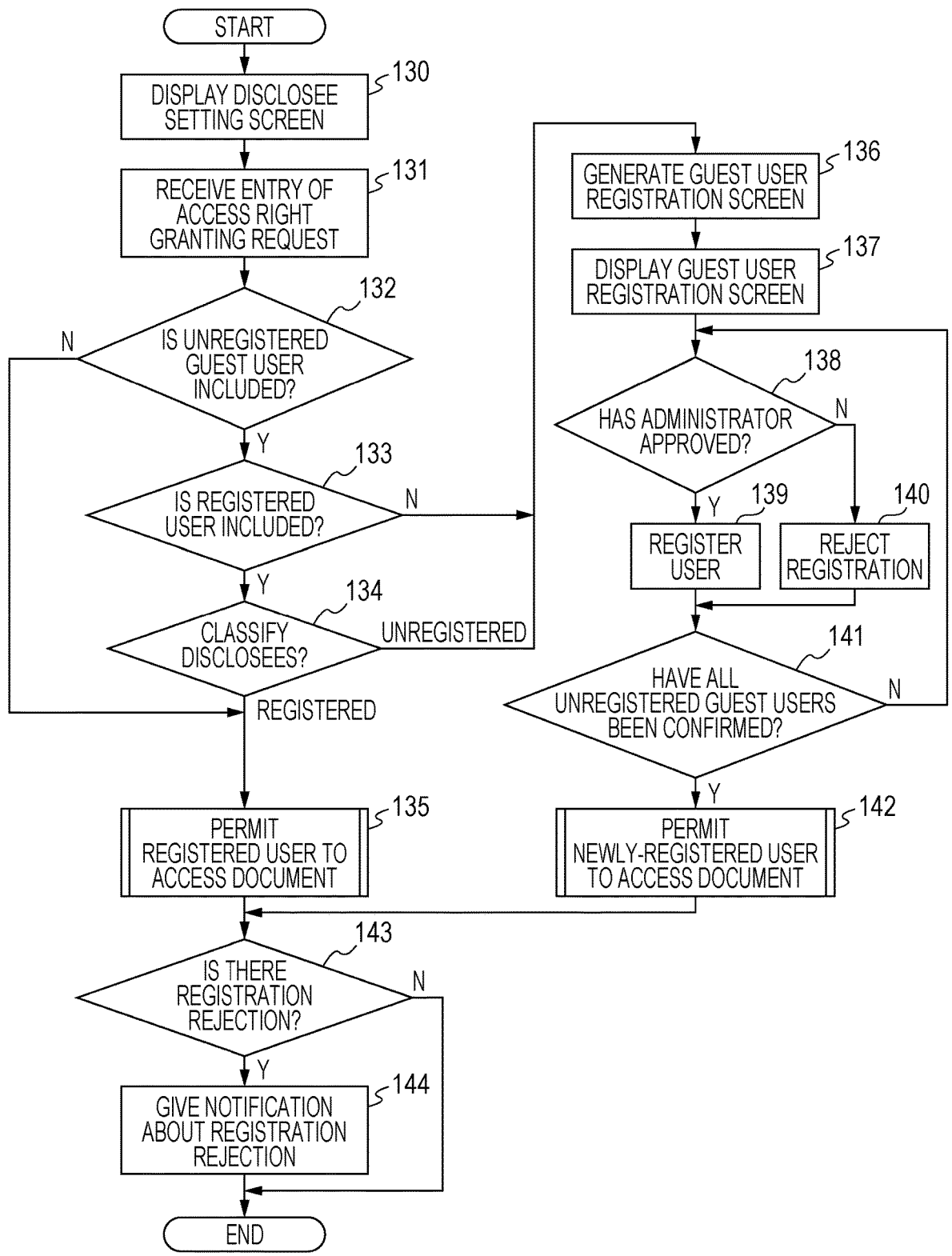
FIG. 13 is a flowchart illustrating an example of flow of processing performed by a document management program according to a second exemplary embodiment.

FIG. 13 is a flowchart illustrating an example of flow of processing performed by a document management program 15A according to the second exemplary embodiment. Although a case where a document managed in a tenant A is disclosed to a guest user is described in the present exemplary embodiment, the same applies to a case where a document managed in a different tenant is disclosed to a guest user.

First, when the document management apparatus 10 receives an instruction to set a disclosee from an end user terminal apparatus 21A, a CPU 11 activates the document management program 15A and executes the following steps.

In step 130 of FIG. 13, the CPU 11 performs control for displaying, for example, the disclosee setting screen 40 illustrated in FIG. 6 on the end user terminal apparatus 21A.

In step 131, the CPU 11 receives entry of an access right granting request received from the end user terminal apparatus 21A. Disclosure information of a document included in the access right granting request is registered in a disclosure information management DB 15B, and disclosee information on a disclosee(s) to which the document is to be disclosed is registered in a disclosee information management DB 15C.

In step 132, the CPU 11 determines whether or not the disclosee(s) include an unregistered guest user by referring to the disclosee information management DB 15C. In a case where the disclosee(s) include an unregistered guest user (Yes in step 132), step 133 is performed. In a case where the disclosee(s) include no unregistered guest user, that is, all of the disclosee(s) are registered users (No in step 132), step 135 is performed.

In step 133, the CPU 11 determines whether or not the disclosee(s) include a registered user by referring to the disclosee information management DB 15C. In a case where the disclosee(s) include a registered user, that is, the disclosee(s) include both an unregistered guest user and a registered user (Yes in step 133), step 134 is performed. In a case where the disclosee(s) include no registered user, that is, all of the disclosee(s) are unregistered guest users (No in step 133), step 136 is performed. The "registered user" encompasses an end user of the tenant A and a guest user who was registered in the past.

In step 134, the CPU 11 classifies the disclosees included in the disclosee list into registered and unregistered. In a case where a disclosee is classified into registered (in a case where the disclosee has been already registered), step 135 is performed. Meanwhile, in a case where the disclosee is classified into unregistered (in a case where the disclosee has not been registered yet), step 136 is performed.

In step 135, the CPU 11 permits a disclosee (a registered user in this example) to access the document upon access from the disclosee. Note that the document access permission processing in step 135 is similar to the document access permission processing illustrated in FIG. 9, and therefore description thereof is omitted.

Meanwhile, in step 136, the CPU 11 acquires information on a guest user who is an unregistered user from the disclosee information management DB 15C and generates, for example, a guest user registration screen 50 illustrated in FIG. 7.

In step 137, the CPU 11 performs control for displaying the guest user registration screen 50 generated in step 136 on the administrator terminal apparatus 20A.

In step 138, the CPU 11 determines whether or not a tenant administrator has approved registration of the unregistered guest user. In a case where it is determined that the tenant administrator has approved registration of the guest user, that is, the tenant administrator has pressed a "REGISTER" button 50B of the guest user registration screen 50 (Yes in step 138), step 139 is performed. Meanwhile, in a case where it is determined that the tenant administrator has not approved registration of the guest user, that is, the tenant administrator has pressed a "REJECT" button 50C of the guest user registration screen 50 (No in step 138), step 140 is performed.

In step 139, the CPU 11 registers the unregistered guest user in the user management DB 15D and the disclosee information management DB 15C upon the approval by the tenant administrator in step 138.

In step 140, the CPU 11 gives the unregistered guest user a user registration rejection flag upon the rejection by the tenant administrator in step 138.

In step 141, the CPU 11 determines whether or not approval or disapproval has been confirmed for all of the unregistered guest users. In a case where approval or disapproval has been confirmed for all of the unregistered guest users (Yes in step 141), step 142 is performed. Meanwhile, in a case where it is determined that approval or disapproval has not been confirmed for all of the unregistered guest users (No in step 141), the processing returns to step 138, and the processes are repeated.

In step 142, the CPU 11 permits a disclosee (a newly-registered user in this example) to access the document upon access from the disclosee. Note that the document access permission processing in step 142 is similar to the document access permission processing illustrated in FIG. 9, and description thereof is omitted.

In step 143, the CPU 11 determines whether or not there is registration rejection, that is, whether or not there is a guest user given a rejection flag in step 140. In a case where it is determined that there is registration rejection (Yes in step 143), step 144 is performed. Meanwhile, in a case where it is determined that there is no registration rejection (No in step 143), the series of processing performed by the document management program 15A is finished.

In step 144, the CPU 11 notifies the end user terminal apparatus 21A of an end user who has requested registration of the guest user about registration rejection, for example, by e-mail and finishes the series of processing performed by the document management program 15A. The notification about the registration rejection may be given in step 140. In this case, an e-mail including the notification about the registration rejection is transmitted without giving the rejection flag. In this case, step 143 and step 144 are unnecessary.

As described above, according to the present exemplary embodiment, in a case where an end user attempts to disclose a document to a guest user, a tenant administrator or a system administrator needs to approve the disclosee only at a time of registration of the guest user. Since the tenant administrator or the system administrator does not need to approve a disclosee every time a document is disclosed, the approving work becomes less troublesome.

Furthermore, a document is sequentially disclosed to a newly-registered user and a registered user. Accordingly, the registered user can acquire the document without waiting for registration of the new user.

In the embodiments above, the term "processor" refers to hardware in a broad sense. Examples of the processor include general processors (e.g., CPU: Central Processing Unit), and dedicated processors (e.g., GPU: Graphics Processing Unit, ASIC: Application Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed.

A document management apparatus has been described above as an example of an information processing apparatus according to the exemplary embodiments. An exemplary embodiment may be a program for causing a computer to execute functions of units of the document management apparatus. An exemplary embodiment may be a computer-readable non-transitory recording medium in which the program is stored.

The configurations of the document management apparatuses described in the above exemplary embodiments are merely examples and may be changed in accordance with a situation without departing from the spirit of the present disclosure.

The flow of the processing of the program described in the above exemplary embodiments is an example, and deletion of an unnecessary step, addition of a new step, and change of a processing order may be made without departing from the spirit of the present disclosure.

Although a case where the processing according to the exemplary embodiments is realized by a software configuration by using a computer by executing a program has been described in the above exemplary embodiments, this is not restrictive. The exemplary embodiments may be realized, for example, by a hardware configuration or a combination of hardware configuration and software configuration.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An information processing apparatus comprising
a processor configured to
   receive, from a registered user of a tenant, entry of an access right granting request to grant an other user a right to access an electronic document included in managed data;
   in a case where the other user is an unregistered user who has not been registered yet in a database,
      prompt the registered user to enter additional information on the other user comprising an email address of the unregistered user, and receive, from the registered user, the additional information on the other user, upon receiving the access right granting request with the additional information on the other user, automatically prompt an administrator of the tenant who is different from the registered user and who manages the managed data, to enter an approval or rejection of the access right granting request made by the registered user while presenting the additional information on the other user to the administrator in a manner that visually conveys whether registration of the unregistered user is recommended, and only upon receiving the approval from the administrator, register the other user in the database, and permit the other user to access the electronic document, in a case where the other user has already been registered in the database on a basis of past approval by the administrator, permit the other user to access the electronic document without prompting entry of the additional information on the other user by the registered user and without prompting entry of the approval or rejection by the administrator, wherein the processor is configured to determine whether or not the unregistered user is a user for whom rejection of registration is recommended on a basis of a domain name of the e-mail address, and wherein the administrator and the registered user each receive a client access license to use the information processing apparatus for the tenant.

2. The information processing apparatus according to claim 1, wherein the processor is configured to cause a setting screen for entry of the access right granting request to grant the other user the right to access the electronic document to be displayed on a terminal apparatus of the registered user who has a right to access the electronic document and has an authority restricted more than an authority of the administrator, and receive entry of the additional information on the unregistered user on the setting screen.

3. The information processing apparatus according to claim 2, wherein on the setting screen, a registered user, who has been already registered, is further selectable as a disclosee to whom the electronic document is to be disclosed; and in a case where the unregistered user and the registered user are set as disclosees to whom the electronic document is to be disclosed on the setting screen, the processor permits, after registration of the unregistered user as a newly-registered user by the administrator, the newly-registered user and the registered user to access the electronic document.

4. The information processing apparatus according to claim 2, wherein on the setting screen, a registered user, who has been already registered, is further selectable as a disclosee to whom the electronic document is to be disclosed; and in a case where the unregistered user and the registered user are set as disclosees to whom the electronic document is to be disclosed on the setting screen, the processor requests the administrator to register the information on the unregistered user and permit the registered user to access the electronic document.

5. The information processing apparatus according to claim 1, wherein the processor causes a registration screen including a list of the unregistered user to be displayed on a terminal apparatus of the administrator.

6. The information processing apparatus according to claim 2, wherein the processor causes a registration screen including a list of the unregistered user to be displayed on a terminal apparatus of the administrator.

7. The information processing apparatus according to claim 3, wherein the processor causes a registration screen including a list of the unregistered user to be displayed on a terminal apparatus of the administrator.

8. The information processing apparatus according to claim 4, wherein the processor causes a registration screen including a list of unregistered users to be displayed on a terminal apparatus of the administrator.

9. The information processing apparatus according to claim 5, wherein the processor is configured to change a form of display of the registration screen so that an unregistered user for whom rejection of registration is recommended among the unregistered users included in the list is distinguishable.

10. The information processing apparatus according to claim 6, wherein the processor is configured to change a form of display of the registration screen so that an unregistered user for whom rejection of registration is recommended among the unregistered users included in the list is distinguishable.

11. The information processing apparatus according to claim 7, wherein the processor is configured to change a form of display of the registration screen so that an unregistered user for whom rejection of registration is recommended among the unregistered users included in the list is distinguishable.

12. The information processing apparatus according to claim 8, wherein the processor is configured to change a form of display of the registration screen so that an unregistered user for whom rejection of registration is recommended among the unregistered users included in the list is distinguishable.

13. A non-transitory computer readable medium storing a program causing a computer to execute a process for information processing, the process comprising:

receiving, from a registered user of a tenant, entry of an access right granting request to grant an other user a right to access an electronic document included in managed data;

in a case where the other user is an unregistered user who has not been registered yet in a database, prompting the registered user to enter additional information on the other user comprising an email address of the unregistered user, and receiving, from the registered user, the additional information on the other user, upon receiving the access right granting request with the additional information on the other user, automatically prompting an administrator of the tenant who is different from the registered user and who manages the managed data, to enter an approval or rejection of the access right granting request made by the registered user while presenting the additional information on the other user to the administrator in a manner that visually conveys whether registration of the unregistered user is recommended, and only upon receiving the approval from the administrator, registering the other user in the database, and permitting the other user to access the electronic document, in a case where the other user has already been registered in the database on a basis of past approval by the administrator, permitting the other user to access the electronic document without prompting entry of the additional information on the other user by the registered user and without prompting entry of the approval or rejection by the administrator, wherein the process further includes determining whether or not the unregistered user is a user for whom rejection of registration is recommended on a basis of a domain name of the e-mail address, and wherein the administrator and the registered user are each receive a client access license to use the information processing apparatus for the tenant.

14. An information processing method comprising:

receiving, from a registered user of a tenant, entry of an access right granting request to grant an other user a right to access an electronic document included in managed data;

in a case where the other user is an unregistered user who has not been registered yet in a database, prompting the registered user to enter additional information on the other user comprising an email address of the unregistered user, and receiving, from the registered user, the additional information on the other user, upon receiving the access right granting request with the additional information on the other user, automatically prompting an administrator of the tenant who is different from the registered user and who manages the managed data, to enter an approval or rejection of the access right granting request made by the registered user while presenting the additional information on the other user to the administrator in a manner that visually conveys whether registration of the unregistered user is recommended, and only upon receiving the approval from the administrator, registering the other user in the database, and permitting the other user to access the electronic document, in a case where the other user has already been registered in the database on a basis of past approval by the administrator, permitting the other user to access the electronic document without prompting entry of the additional information on the other user by the registered user and without prompting entry of the approval or rejection by the administrator, wherein the method further includes determining whether or not the unregistered user is a user for whom rejection of registration is recommended on a basis of a domain name of the e-mail address, and wherein the administrator and the registered user each receive a client access license to use the information processing apparatus for the tenant.

\* \* \* \* \*